Dec. 11, 1934. K. E. PRINDLE 1,983,875
LAMINATED MATERIAL
Filed Dec. 10, 1930
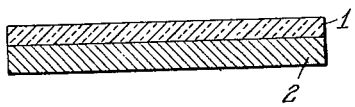
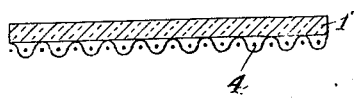
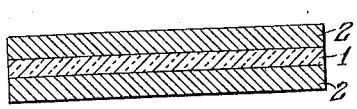
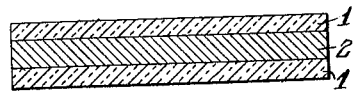

Patented Dec. 11, 1934

1,983,875

UNITED STATES PATENT OFFICE 1,983,875

LAMINATED MATERIAL

Karl Edwin Prindle, Cleveland, Ohio, assignor to Du Pont Cellophane Company, Inc., New York, N. Y., a corporation of Delaware Application December 10, 1930, Serial No. 501,187

20 Claims. (Cl. 154—46)

This invention relates to a laminated material and more particularly to a laminated material which contains at least one ply or lamination of a moistureproof sheet or film of regenerated cellulose.

Recently, there has appeared on the market a new material which consists of moistureproof sheets or films of regenerated cellulose. By the term "moistureproof" is meant the ability to resist the diffusion of water vapor to an extent at least as great as that displayed by waxed papers employed as wrappers and functioning to resist the penetration of water vapor thereto through to a substantial degree for a substantial period of time, depending on the article wrapped and/or being approximately 7 times or more, and preferably 20 to 30 times, as effective as uncoated sheets or films of regenerated cellulose when tested in accordance with the test set forth in the Journal of Industrial and Engineering Chemistry on page 575, vol. 21, No. 6 (June 1929). In one of its modifications, this material consists of a sheet or film of regenerated cellulose combined with, as by being coated on both sides, a moistureproofing composition comprising, for example, a cellulose derivative and a wax with or without a plasticizer and preferably also a gum or resin. These coated sheets or films of regenerated cellulose, in addition to being moistureproof, are also flexible, non-tacky, tough and preferably also transparent. By virture of these characteristics they are particularly suitable for packaging of goods which are desired to be exhibited to view and which are desired to be retained in their original state. They, therefore, have been used extensively for wrapping foodstuffs, such as cakes, cookies, fruits, etc. and other products, such as cigars and tobacco, as well as other goods where the value of the product is dependent on the preservation of the amount of moisture which the goods originally contained at the time of wrapping.

There are, however, a number of purposes where the transparency and flexibility are not strictly required and, indeed, there are cases where rigidity and improved strength are definitely desired.

I have found that by laminating a moistureproof material such as a moistureproof sheet or film of regenerated cellulose to itself, paper, cardboard, paperboard, boxboard, fabrics, metal foil, corkboard and the like, I can obtain a product which is capable of being used where moistureproof sheets or films of regenerated cellulose per se are not suitable.

It is therefore an object of this invention to provide a laminated material having at least one ply thereof consisting of a moistureproof material such as a moistureproof sheet or film of regenerated cellulose.

Another object of this invention is to provide a material which comprises a laminated material wherein at least one ply thereof consists of a moistureproof material such as a moistureproof sheet or film of regenerated cellulose secured to itself, paper, cardboard, paperboard, boxboard, fabric, metal foil, corkboard and the like.

Other objects will appear from the following description, appended claims and accompanying drawing in which:

Figures 1 to 4 illustrate exaggerated cross-sections of various forms of materials constituting this invention.

In accordance with the principles of this invention, a moistureproof material, for example a moistureproof sheet or film or regenerated cellulose 1 is laminated or combined with various other materials 2, such as itself, cardboard, paperboard, boxboard, fabric, metal foil, corkboard, etc. To practice this invention it is necessary to use an adhesive which will satisfactorily produce adhesion between the various laminæ. I have found, for example, that an adhesive having the characteristics possessed by the example hereafter set forth will produce satisfactory results, although it is clear that the variations of this and even other adhesives may be developed which may also be suitable for this purpose.

Example

| | Part by weight |
|---|---|
| Pontianiac chips | 1.0 |
| Castor oil | 0.6 |
| Ethyl alcohol (95%) | 1.0 |

The adhesive may be applied to either one or both of the materials and then the materials may be superposed on one another. Sufficient pressure with or without heat is then applied and maintained until satisfactory adhesion between the materials has been effected.

When moistureproof sheets of regenerated cellulose 1 are laminated as described, the flexibility of the product will, of course, depend on the flexibility of the material which is used in the combination. It is apparent that the product may vary from being relatively flexible to being decidedly rigid.

The transparency will usually depend upon the transparency of the combining materials. When transparent moistureproof sheets are plied to transparent bases, it is obvious that the final product will also be transparent. However, when an opaque or translucent material is laminated to transparent moistureproof sheets, the final product will have a light permeability substantially the same as that of the base.

It is within the purview of this invention to combine moistureproof sheets or films with cloth or fabrics of all kinds. For example I may laminate or combine a moistureproof sheet or film of regenerated cellulose 1 with an open mesh fabric 4 (see Figure 2), and thus produce a material which is transparent without sacrificing strength, durability, rigidity and flexibility.

The laminæ or plies of the final laminated product are of substantially the same length and width. In other words, the plies or laminæ of the laminated product are substantially coextensive. As a consequence, the laminated product is substantially stronger than the non-laminated moistureproof film per se.

The laminated product which constitutes this invention may consist of any number of plies. It may consist in one of its modifications of two plies, viz. a moistureproof material such as a moistureproof sheet or film of regenerated cellulose 1 and a ply of any suitable material 2, as illustrated in Figure 1. It may consist of a moistureproof material, for example a moistureproof sheet or film of regenerated cellulose 1 disposed between two sheets 2 of similar or non-similar materials as shown in Figure 3. As illustrated in Figure 4, the product may also consist of a ply 2 of any of the previously mentioned materials disposed between two moistureproof sheets of regenerated cellulose.

In order to enhance the attractiveness and appearance of the product, the base material may be suitably ornamented as by printing, embossing or otherwise decorating and/or using the colored or otherwise decorated sheets of regenerated cellulose.

The product which constitutes this invention may be made in various sizes and may be used as such or fabricated into boxes, bags and containers in general and of other materials for which similar materials are customarily used.

Since it is obvious that various changes in the specific details above set forth may be made by one skilled in the art, this invention is not restricted thereto except as set forth in the appended claims.

I claim:

1. A laminated material having at least one lamina consisting of a moistureproof sheet or film of regenerated cellulose secured by a water-insoluble adhesive to the adjacent lamina, the laminæ being substantially coextensive.

2. A laminated material comprising a moistureproof sheet or film of regenerated cellulose secured by a water-insoluble adhesive to a fibrous material, the laminæ being substantially coextensive.

3. A laminated material comprising a moistureproof sheet or film of regenerated cellulose secured by a water-insoluble adhesive to paper, the laminæ being substantially coextensive.

4. A laminated material comprising a moistureproof sheet or film of regenerated cellulose secured by a water-insoluble adhesive to a fabric, the laminæ being substantially coextensive.

5. A laminated material comprising a moistureproof sheet or film of regenerated cellulose secured by a water-insoluble adhesive to an open mesh fabric, the laminæ being substantially coextensive.

6. A laminated material comprising a moistureproof sheet or film of regenerated cellulose secured by a water-insoluble adhesive to a metal foil, the laminæ being substantially coextensive.

7. A laminated material having at least one lamina consisting of a base coated on both sides thereof with a moistureproofing composition comprising a cellulose derivative and a wax secured by a water-insoluble adhesive to the adjacent lamina, the laminæ being substantially coextensive.

8. A laminated material having at least one lamina consisting of a base coated on both sides thereof with a moistureproofing composition comprising a cellulose derivative, a resin and a wax secured by a water-insoluble adhesive to the adjacent lamina, the laminæ being substantially coextensive.

9. A laminated material having at least one lamina consisting of a sheet or film of regenerated cellulose coated on both sides thereof with a moistureproofing composition comprising a cellulose derivative and a wax secured by a water-insoluble adhesive to the adjacent lamina, the laminæ being substantially coextensive.

10. A laminated material having at least one lamina consisting of a sheet or film of regenerated cellulose coated on both sides thereof with a moistureproofing composition comprising a cellulose derivative, a resin and a wax secured by a water-insoluble adhesive to the adjacent lamina, the laminæ being substantially coextensive.

11. A laminated material having at least one lamina consisting of a sheet or film coated on both sides thereof with a moistureproofing composition containing a wax secured by a water-insoluble adhesive to the adjacent lamina, the laminæ being substantially coextensive.

12. A laminated material having at least one lamina consisting of a sheet or film of regenerated cellulose coated on both sides thereof with a moistureproofing composition containing a wax secured by a water-insoluble adhesive to the adjacent laminæ, the laminæ being substantially coextensive.

13. A laminated material comprising a sheet or film of regenerated cellulose coated on both sides thereof with a moistureproofing composition containing a wax and secured by a water-insoluble adhesive to a fibrous material, the laminæ being substantially coextensive.

14. A laminated material comprising a sheet or film of regenerated cellulose coated on both sides thereof with a moistureproofing composition containing a wax and secured by a water-insoluble adhesive to paper, the laminæ being substantially coextensive.

15. A laminated material comprising a sheet or film of regenerated cellulose coated on both sides thereof with a moistureproofing composition containing a wax and secured by a water-insoluble adhesive to a fabric, the laminæ being substantially coextensive.

16. A laminated material comprising a sheet or film of regenerated cellulose coated on both sides thereof with a moistureproofing composition containing a wax and secured by a water-insoluble adhesive to an open mesh fabric, the laminæ being substantially coextensive.

17. A laminated material comprising a sheet or film of regenerated cellulose coated on both sides thereof with a moistureproofing composition containing a wax and secured by a water-insoluble adhesive to metal foil, the laminæ being substantially coextensive.

18. A laminated material having at least one lamina consisting of a moistureproof sheet or film of regenerated cellulose secured by a water-insoluble adhesive to the adjacent lamina, the laminæ being substantially coextensive and the adhesive comprising gum pontianiac and castor oil.

19. A laminated material having at least one lamina consisting of a sheet or film of regenerated cellulose coated on both sides thereof with a moistureproofing composition comprising a cellulose derivative and a wax secured by a water-insoluble adhesive to the adjacent lamina, the laminæ being substantially coextensive and the adhesive comprising gum pontianiac and castor oil.

20. A laminated material comprising a sheet or film of regenerated cellulose coated on both sides with a moistureproofing composition containing a wax and secured by a water-insoluble adhesive to the adjacent lamina, the laminæ being substantially coextensive and the adhesive comprising gum pontianiac and castor oil.

KARL EDWIN PRINDLE.